United States Patent Office 3,488,004
Patented Jan. 6, 1970

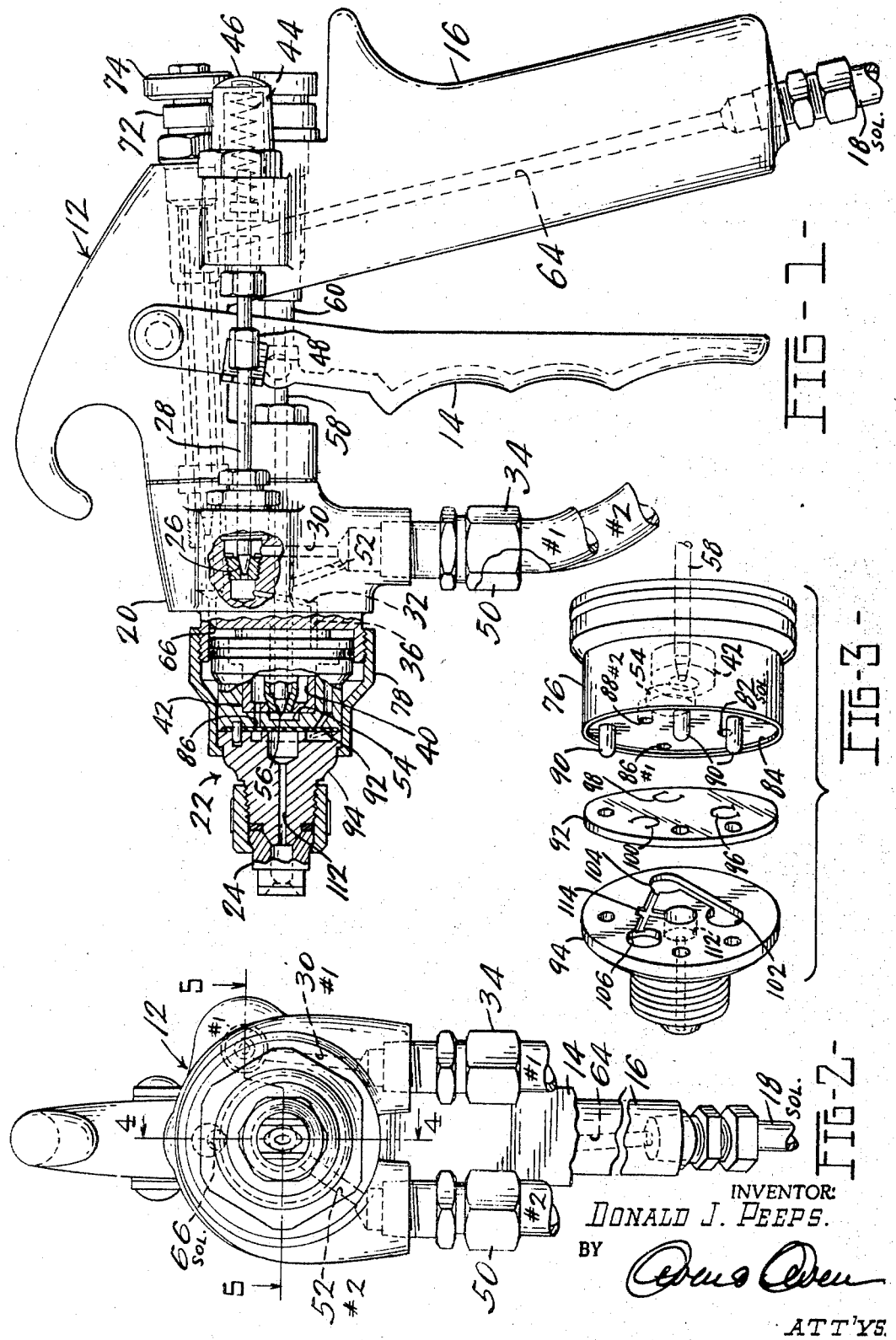

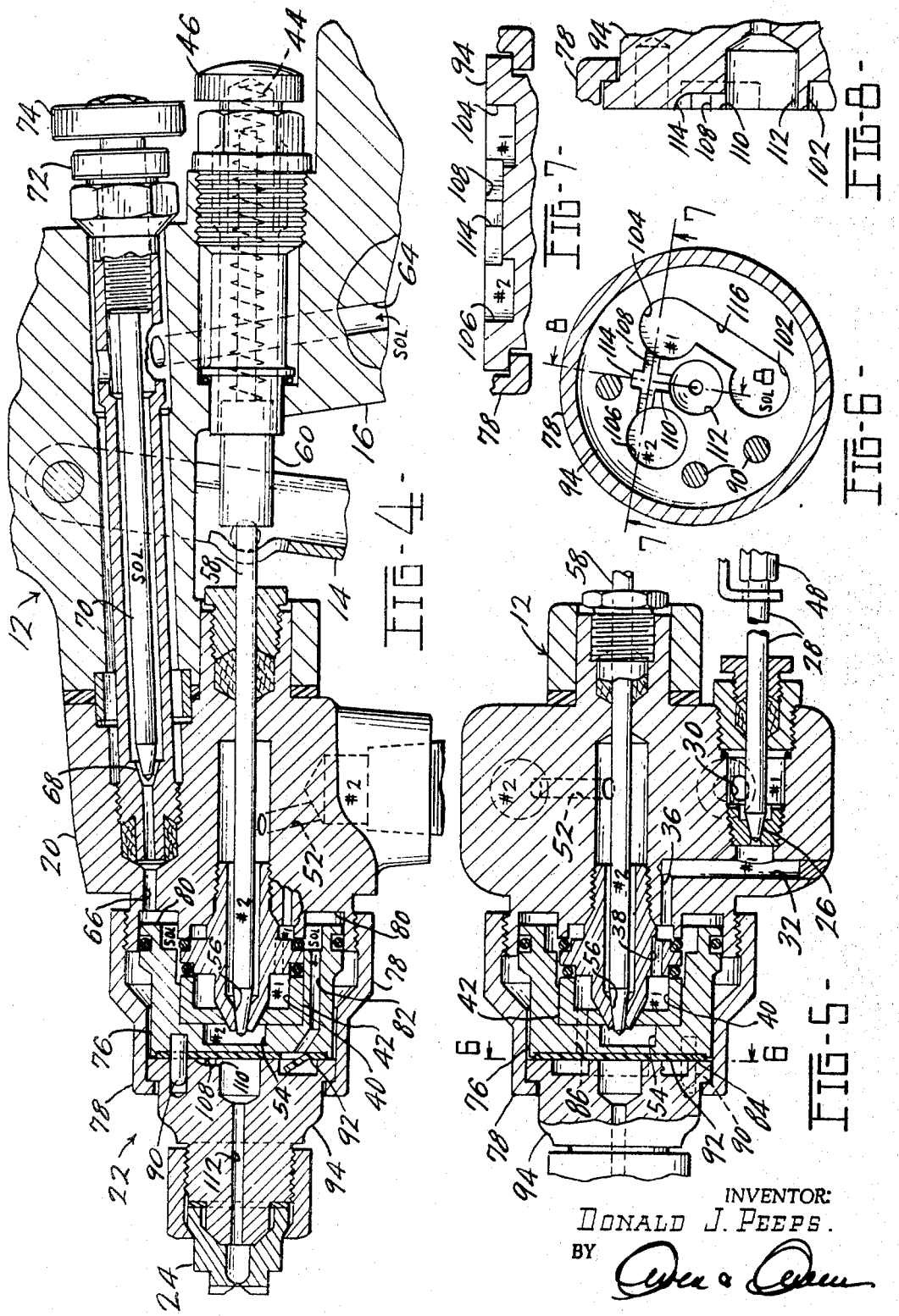

3,488,004
AIRLESS DUAL COMPONENT SPRAY GUN
Donald J. Peeps, Rossford, Ohio, assignor to The DeVilbiss Company, Toledo, Ohio, a corporation of Ohio
Filed Apr. 8, 1968, Ser. No. 719,333
Int. Cl. B05b 11/00
U.S. Cl. 239—422       8 Claims

ABSTRACT OF THE DISCLOSURE

An improved spray head for an airless, dual component, foam spray gun. Two high pressure fluid component streams flow through control valves in the gun body into chambers in a mixing head. The two streams are turbulently mixed as they flow from the chambers to a spray nozzle. The spray head is cleaned by forcing a solvent into a selected one of the fluid chambers in the head. The solvent flows turbulently through the chamber to the nozzle. The turbulent flow also causes the solvent to clean the other fluid chambers. A Teflon check valve plate prevents the fluid components and the solvent from flowing from the mixing head back into the individual fluid supply passages in preceding parts.

Background of the invention

This invention relates generally to an improved gun for spraying coating materials, and particularly, to an improved spray head in a spray gun for plural component fluid coating materials such as polyesters.

Development and widespread employment of sprayable plastics of various types have created a need for suitable apparatus for applying these materials as coatings on articles in a quick and efficient manner. These materials cannot be applied in the conventional manner and with conventional spray apparatus since the materials are usually comprised of two or more chemically reactive portions that must be maintained separate from each other until the reaction is intended and desired.

In producing chemically reactive component coatings such as polyesters, two separate liquid components are employed. One component is an admixture of a portion of the resin and a promoter while the other component consists of the remainder of the resin and a suitable catalyst, usually a peroxide. Other two-component material systems, such as polyester or polyether urethanes, are equally suitable for application as semisolid or expanded foams. Usually such material systems involve a urethane type of resin, which may contain one or several additives, such as surfactants and blowing agents, as one component, while the other component is a suitable reactive material such as an isocyanate. When the two liquids are combined, an exothermic reaction takes place which changes the liquid blowing agent to a gas, which is entrapped and expands the total mass in the form of a rigid foam. Reaction also causes the mixture to harden. It will be readily apparent that, if some of the first liquid were combined with any of the second liquid before passing through a mixing chamber, foaming and hardening would begin at that point. Even though the reaction were not sufficiently rapid to effect mixing, there would still be the hazard that the combined portions would react within the mixing apparatus when it is not operating and cause the nozzle of the applicator to become clogged or a flow control valve or other movable part to stick.

In the past, several problems have existed in airless spray guns for coating materials made up of two or more rapidly reacting materials. If the spray gun has a large mixing chamber, the components will harden at the corners and edges of the chamber while the gun is being used. Even if the mixing chamber is small and streamlined, it is difficult to clean the chamber each time the gun is used. If the gun is not promptly cleaned, the coating material will harden and may ruin the entire spray head.

Summary of the invention

The dual component spray gun of the present invention includes a conventional spray gun body, a novel spray head and a conventional nozzle. The gun body has a solvent passage and control valve, and two fluid component passages and trigger actuated control valves. The solvent and fluid component passages are connected to remote, pressurized sources.

The three passages are connected to the spray head, which includes a thin check valve plate and a mixing head. The check valve plate comprises a thin sheet of Teflon having three flexible valve flaps cut into it. The valve flaps are aligned with and completely cover the two liquid component and one solvent passages in the spray gun body. Three chambers in the mixing head are aligned with the respective check valves and are sufficiently large that the flexible valve flaps can open into them. A first channel interconnects the two chambers for the liquid components and a second channel connects the first channel to a central passage leading to the spray nozzle. The two channels, which are substantially perpendicular, are so sized and have sharp corners and edges to cause a turbulent flow of the liquids. The turbulent flow is sufficient to mix the liquids before they flow to the nozzle. A third channel connects the solvent chamber to one of the fluid chambers and to the first and second channels above described. The spray gun is cleaned by opening a solvent control valve in the gun body. The solvent will flow through and clean the check valve, the solvent chamber, the connected fluid chamber, the first and second channels, the central passage to the nozzle, and the nozzle itself. While the solvent is admitted to a first one of the liquid receiving chambers, it flows with sufficient turbulence to produce eddy currents of sufficient intensity to clean out the opposite liquid chamber. The check valves, of course, prevent the solvent and the two liquid components from flowing from the chambers in the mixing head back into the passages in the gun body.

It is an object of the invention to provide a simple and efficient apparatus which will permit deposition of or coating articles with a mixture of two or more separately maintained liquids.

Another object of the present invention is to provide an improved mixing chamber for a plural component spray gun. It is another object of the invention to provide an improved spray gun of economical construction, having only a single spray nozzle and yet efficiently and effectively spraying a broad range of plural liquid component materials of both foaming and non-foaming types.

Still another object of the present invention is to provide a spray head for an airless dual component spray gun that is easy to clean without disassembly.

Other objects and advantages of the invention will appear from the following detailed description of a particular embodiment thereof, reference being made to the accompanying drawings.

Brief description of the drawings

FIG. 1 is a side view with parts broken away of apparatus embodying the invention;

FIG. 2 is a front view of the apparatus of FIG. 1;

FIG. 3 is an exploded perspective view showing a mixing head and a valve plate which embody the invention;

FIG. 4 is a cross-sectional view taken along line 4—4 of FIG. 2;

FIG. 5 is a cross-sectional view taken along line 5—5 of FIG. 2;

FIG. 6 is a cross-sectional view taken along line 6—6 of FIG. 5;

FIG. 7 is a cross-sectional view taken along line 7—7 of FIG. 6; and

FIG. 8 is a cross-sectional view taken along line 8—8 of FIG. 6.

Description of the preferred embodiment

A specific embodiment of the present invention is shown in the drawings and comprises a spray gun body 12 to which a trigger 14 is pivotally attached in the usual manner. A handle 16 extends from the rear of the body and carries a solvent inlet 18 extending therefrom for connection to a high pressure source of solvent which is used to clean the spray gun after each spraying operation.

At its front end, the spray gun body 12 carries a fluid control head 20 which surrounds and retains valves for controlling the flow of two fluid components from their respective pressurized sources as hereinafter described. For convenience, the two fluid component passages have been labeled "No. 1" and "No. 2," and the solvent passages have been labeled "sol." A spray head 22 is attached to the front end of the fluid control head 20 for mixing the two liquid components. A spray nozzle 24 of a conventional "airless" type is attached to the front of the spray head 22 for discharging the mixed components to form, by airless atomization, a spray to be deposited on the work.

Two trigger actuated valves are located in the fluid control head 20. The first valve includes a fluid orifice 26 and a cooperating first needle valve 28. The fluid orifice 26 and needle valve 28 are located between two passages 30 and 32 in the fluid control head 20. A first fluid component source under a pressure ranging from 300 p.s.i. to 4,000 p.s.i., for example, is connected through a standard hose fitting 34 to the passage 30. Passage 32 is connected through a bore 36 and a bore 38 to an annular fluid chamber 40 lying between the fluid control head 20 and an adapter insert 42. The needle valve 28 is held in a normally closed position by a spring 44 which is retained in an end cap 46. When the trigger 14 is pulled against an adjustable nut 48 which is attached to the stem of the needle valve 28, the valve 28 is opened.

A second fluid component source, preferably under the same pressure as the first source, immediately prior to mixing, is connected through a standard hose fitting 50 to a passage 52. The second of the two trigger actuated valves, which is connected between the passage 52 and the fluid chamber 54, includes a valve seat 56 and a cooperating fluid needle valve 58. The needle valve 58 is held in a normally closed position by a spring and an end cap in a manner similar to that for the needle valve 28. When the trigger 14 is pulled against a stop 60 on the stem of the valve 58, the valve 58 is opened.

The sequence in which the needle valves 28 and 58 are opened as trigger 14 is pulled may be changed by turning the adjustable nut 48 on the stem of the first needle valve 28. It is usually preferable to have both valves open simultaneously.

A high pressure solvent source is connected to the solvent inlet 18 at the base of the gun handle 16. The inlet 18 is connected through a bore 64 and a solvent control valve to a passage 66 in the fluid control head 20. The solvent control valve (shown in an open position) comprises a fluid orifice 68 and a cooperating needle valve 70. The needle valve 70 is threaded into a bonnet 72 and is opened by turning a control nut 74 which is fixed to the valve stem.

The spray head 22 and an adapter 76 are attached to the fluid control head 20 with an adapter nut 78. The solvent passage 66 is connected through an annular chamber 80 and a passage 82 to the flat face 84 of the adapter 76. A passage 86 connects the annular fluid chamber 40 for the first fluid component to the face 84 of the adapter 76, while a passage 88 connects the fluid chamber 54 for the other fluid component to the face 84.

Referring now to FIG. 3, three dowels 90 are attached to the adapter 76 for aligning the spray head 22. The spray head 22 generally comprises a thin valve plate 92 and a mixing head 94. In addition to its check valve function, the valve plate 92 serves as a gasket between the adapter 76 and the mixing head 94.

Valve plate 92 can be made from various flexible materials, a preferred one being a thin flexible sheet of fluorocarbon polymer, e.g., polytetrafluoroethylene or Teflon. When the valve plate 92 is aligned on the three dowels 90 and against the flat face 84 of the adapter 76, three flexible valve flaps 96, 98 and 100, cut into the valve plate 92, completely cover the solvent and fluid passages 82, 86 and 88, respectively.

When the mixing head 94 is aligned on the three dowels 90, three chambers 102, 104 and 106 are aligned with the three valve flaps 96, 98 and 100, respectively. Each chamber is large enough for its associated valve flap to open into it when forced open by fluid pressure in the associated passage in the adapter 76.

Referring now to FIGS. 3 and 6–8, the mixing head 94 is shown in detail. A relatively shallow, and therefore restricted, first channel 108 is milled in the mixing head 94 between the two fluid component chambers 104 and 106. A second shallow and restricted channel 110 is milled from the first channel 108 to a central passage 112, which extends through the mixing head 94 to the attached spray nozzle 24. The second channel 110 intersects and is generally perpendicular to the first channel 108 and both channels are small and have sharp edges and corners. In milling the second channel 110, the milling tool will usually cut the channel 110 past the channel 108. This is preferably because the overshoot 114, as well as the small channels and sharp edges and corners, will increase the Reynolds number of the flow, promoting turbulence in the flow of the two fluid components as they move from the chambers 104 and 106 to the passage 112. The turbulence in the fluid flow is responsible for the initial mixing of the two fluid components.

A third channel 116 connects the solvent chamber 102 and the mixing head 94 with one of the fluid chambers 104 or 106 (as shown, the connection is to chamber 104). To clean the gun, the solvent needle valve 70 is opened by turning the control nut 74. The solvent flows serially through the gun body 12, the adapter 76, check valve 96 in the valve plate 92, the solvent chamber 102, the fluid chamber 104, the two channels 108 and 110, the central passage 112, and the spray nozzle 24 which is attached to the front of the mixing head 94. The solvent will clean each passage, channel and chamber as it flows through the gun. Turbulence in the solvent as it flows from the first channel 108 to the second channel 110 will produce eddy currents which will celan the other fluid component chamber 106.

The embodiment herein described can be modified to handle coating materials having more than two components. While the invention has been described in connection with a specific form and disposition of the parts, it should be understood that it is capable of numerous modifications and changes without departing from the scope of the appended claims.

What I claim is:

1. A dual component spray gun comprising a gun body having one solvent and two fluid component passages, means for connecting the solvent passage to a pressurized supply of solvent, means for connecting each of the two fluid component passages to a pressurized supply of a fluid component, a spray head attached to the body, and a spray nozzle attached to the spray head, said spray head comprising: a thin replaceable valve plate attached to the body, said valve plate having a solvent check valve covering the solvent passage and two fluid check valves covering the two fluid component passages, a mixing head attached to said body and positioned against said valve plate, said mixing head having a solvent chamber connected to receive pressurized solvent through the solvent check valve from the solvent passage, said mixing head having two fluid component chambers connected to receive pressurized fluid components through the two fluid check valves from the two fluid component passages, means in said mixing head for mixing pressurized fluid components from the two fluid component chambers, means in said mixing head for delivering the mixed fluid components to the spray nozzle, and means for cleaning said fluid component chambers, said mixing means, said delivering means and the spray nozzle with pressurized solvent from said solvent chamber.

2. The dual component spray gun of claim 1, wherein said means in said mixing head for mixing the two fluid components comprises a first restricted channel connecting the two fluid component chambers, and a second restricted channel intersecting said first channel and connecting said first channel to said delivery means.

3. The dual component spray gun of claim 2, wherein said second channel extends slightly beyond said first channel at its intersection to increase the turbulence in the flow of the two fluid components.

4. The dual component spray gun of claim 2, wherein said second channel is perpendicular to said first channel, and wherein said first and second channels have sharp edges and corners for causing turbulence in the flow of the two fluid components from the two chambers to the nozzle.

5. The dual component spray gun of claim 4, wherein said second channel extends slightly beyond said first channel at its intersection.

6. The dual component spray gun of claim 4, wherein said cleaning means includes a third channel in said mixing head connecting said solvent chamber to one of the two fluid component chambers.

7. The dual component spray gun of claim 1, wherein said cleaning means includes a channel connecting said solvent chamber to one of the two fluid component chambers.

8. The dual component spray gun of claim 1, wherein said valve plate is constructed from a fluorocarbon polymer and wherein said solvent and two fluid check valves comprise flexible flaps cut into said valve plate, each of said flaps being shaped and located to completely cover a respective one of the passages and to open into a respective one of said solvent and fluid component chambers in said mixing head.

References Cited

UNITED STATES PATENTS

| | | | |
|---|---|---|---|
| 2,044,720 | 6/1936 | Fletcher | 239—422 X |
| 2,895,685 | 7/1959 | Peeps | 239—422 X |
| 2,971,700 | 2/1961 | Peeps | 239—422 X |

SAMUEL F. COLEMAN, Primary Examiner